United States Patent Office 3,522,865
Patented Aug. 4, 1970

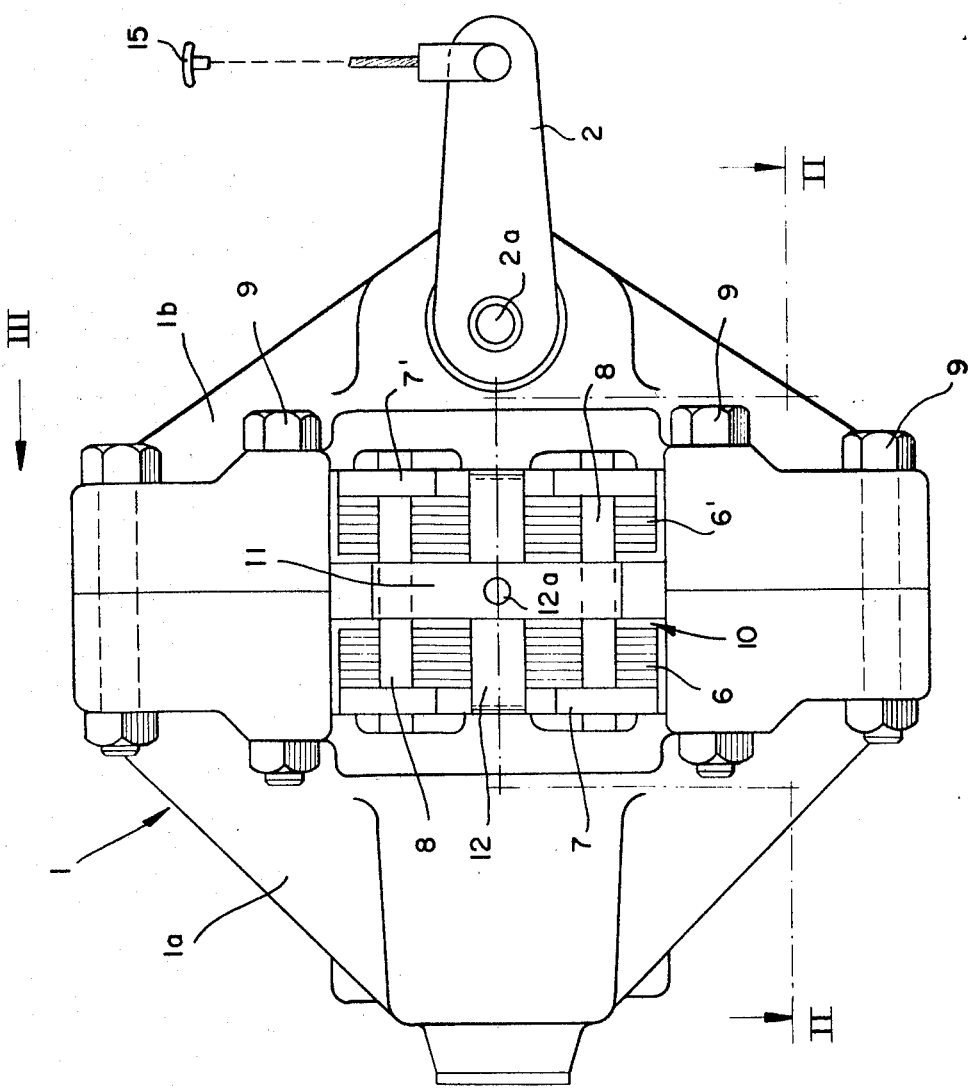

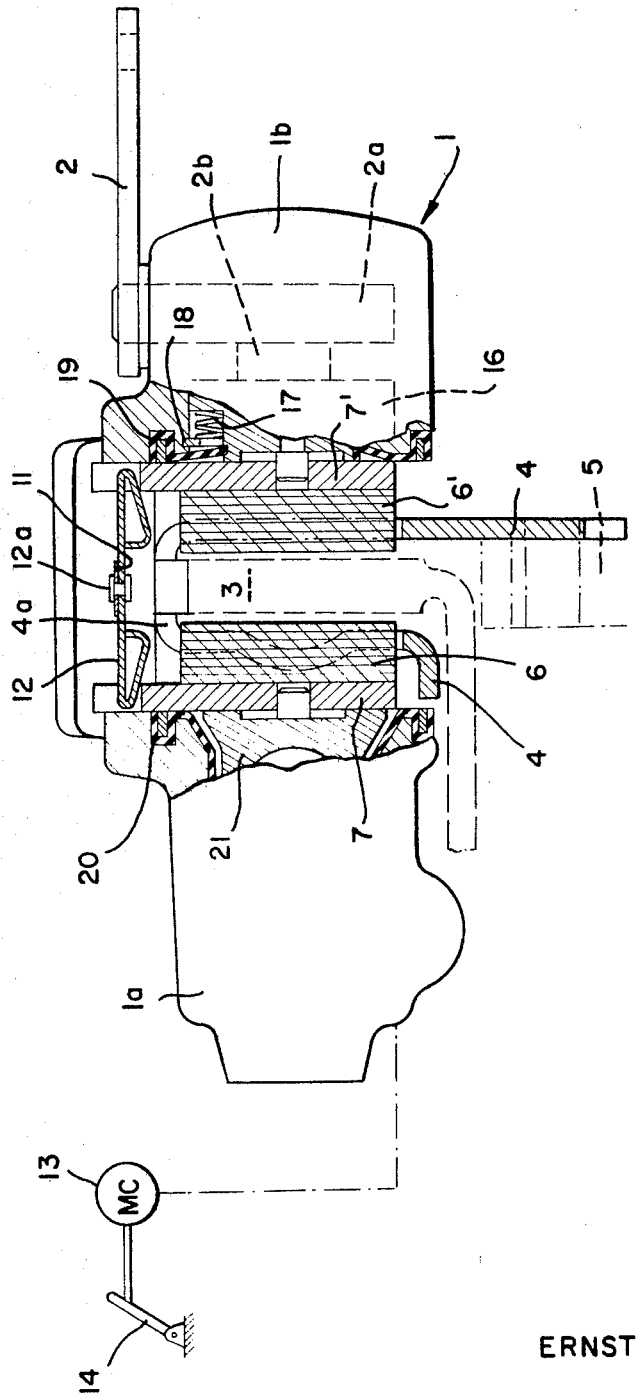

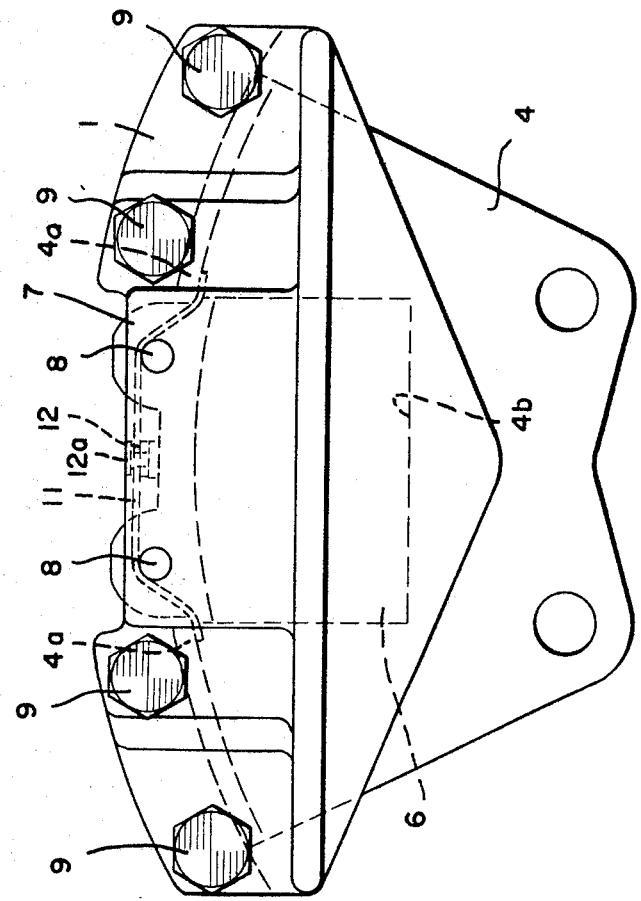

3,522,865
FLOATING-YOKE DISK BRAKE WITH U-SHAPED SUPPORT PLATE
Ernst Meier, Frankfurt am Main, Sindlingen, Germany, assignor to Alfred Teves G.m.b.H., Frankfurt am Main, Germany, a corporation of Germany
Filed Sept. 25, 1968, Ser. No. 762,505
Claims priority, application Germany, Sept. 29, 1967, T 34,910
Int. Cl. F16d 55/224
U.S. Cl. 188—72.4                                      6 Claims

ABSTRACT OF THE DISCLOSURE

A floating-yoke disk brake with a brakeshoe-removal opening spanned by removable pins which support the brakeshoes. A plate which straddles the brake disk is formed with two windows snugly fitting the brakeshoes to absorb all braking stresses, and the brake yoke or caliper is shiftably supported on this plate by the pins and a leaf spring. The leaf spring extends over these pins and engages beneath the plate to hold the brake in position while allowing limited movement of it. A cross tongue on this leaf spring urges the brakeshoes toward their rest positions.

---

My invention relates to a floating-yoke disk brake for use on a motor vehicle and, more particularly, to a new and improved mounting for such disk brakes.

Floating-yoke disk brakes, such as are described in the commonly assigned copending application Ser. No. 704,790 entitled "Floating-Yoke Disk Brake and Dual-Network Vehicle Brake System" by Juan Belart (now U.S. Pat. No. 3,465,852), have many advantages over most other brakes. They are generally simple and sure and even less costly to manufacture than other types of disk and drum brakes.

However, they are often difficult to service and often require troublesome and complicated mountings which absorb the stresses of braking securely while permitting the necessary floating-yoke action.

It is the object of my invention to provide a disk brake which overcomes these disadvantages by being easy to service and by having a very simple and troublefree mounting.

According to a main feature of my invention, the disk-brake caliper or yoke is formed with a radial opening (with respect to the brake disk) for changing the brakeshoes. This allows for simple brakeshoe exchange or replacement without the necessity of disassembling the entire brake, or of removing it from the wheel.

The brakeshoes are, according to a key feature of my invention, guided on guide pins which extend across this opening, so that simple removal of the pins frees the brakeshoes while the pins constitute the sole means for guiding the caliper on a stationary support plate. Thus, an important feature of my invention provides for a support plate which is generally U-shaped and straddles the brake disk, the plate having windows corresponding to the brakeshoe-replacement opening which snugly frame the brakeshoes. Consequently, all the stresses of braking applied to the shoes are absorbed by this plate which is fixed on the vehicle, while the caliper is, in effect, mounted on the brakeshoes.

In accordance with a further feature of my invention, a simple leaf spring lies over these guide pins and catches under the edges of the plate at these windows to hold the brake yoke on the plate under stress while still permitting the necessary axial, floating-yoke-type action of the caliper.

This leaf spring can be provided with a transverse spring tongue which engages the brakeshoes and biases them apart to urge them into their rest positions and to prevent them from rattling or vibrating.

These and other features and objects of my invention will be described in greater detail with reference to the accompanying drawing in which:

FIG. 1 is a top view of a disk brake according to my invention;

FIG. 2 is a section taken along the line II—II of FIG. 1; and

FIG. 3 is a view of the same disk brake taken in the direction of arrow III of FIG. 1.

My brake has a housing or caliper 1 consisting of a lobe 1a and a lobe 1b held together by bolts 9 and having a radial brakeshoe-removal opening 10. A piston 21 in the lobe 1a, whose cylinder bore is closed by a seal 20, is actuatable by hydraulic pressure from a master cylinder 13 operated, in turn, by a brake pedal 14. A piston 16, mounted in the lobe 1b and provided with a seal 19, is actuatable by a crank 2b on a rod 2a connected to a lever 2 which is in turn, actuatable by a hand-brake handle 15. Belleville springs 17 held by a snap ring 18 return this piston 16 to its rest position.

Between the lobes 1a and 1b is a rotatable brake disk 3 shown in dot-dash lines in FIG. 2 and connected to the vehicle wheel as described in the aforementioned application and those of the same class. Two brakeshoes, comprising brake linings 6 and 6' and backing plates 7 and 7', are engageable with opposite faces of this disk 3. The backing plates 7 and 7' are guided on pins 8 which span the opening 10 between the lobes 1a and 1b.

A leaf-spring element 11 overspans these guide pins 8 and engages beneath curved portions 4a of a plate 4. This holds the yoke 1 in position under stress while permitting the necessary axial motion for braking. The yoke 1 itself is well braced on the plate 4 and all the stresses of braking are absorbed by this plate 4 since it is formed with windows 4b snugly framing the brakeshoes.

A second spring element or tongue 12, attached transversely to the first by a rivet 12a, is of outwardly diverging wedge shape and thus serves both to bias the two brakeshoes away from each other and the disk 3 and to prevent them from rattling or vibrating.

To change brakeshoes, one need merely drive out the pins 8 and then turn the spring 12 so that it is parallel to and under the leaf spring 11. Then the old brakeshoes can be removed, new ones inserted, the spring 12 clipped back in place, and the pins driven back in. Dismounting the yoke 1 from the plate 4 is also a simple job, merely requiring withdrawal of the pins 8, snapping out the leaf spring 11, and lifting off the entire yoke 1.

The improvement described and illustrated is believed to admit of many modifications within the ability of persons skilled in the art, all such modifications being considered within the spirit and scope of the invention.

I claim:
1. A disk brake comprising
   a brake disk rotatable about an axis and having a pair of opposite and generally parallel annular faces;
   a nonrotatable caliper support fixed with respect to the axis of said disk and including a plate turned about the edge of said disk while having opposite sides generally parallel to said faces and confronting same, and a bight connecting said sides, said plate being formed with a pair of windows in said sides opening generally radially outwardly with respect to said axis and flanked by opposite portions of said bight;
   a floating-yoke brake caliper straddling the periphery of said disk and having a pair of lobes lying outwardly of said sides of said plate but extending therealong, said caliper being shiftable transversely to said faces and said plate, said caliper being formed with a brakeshoe replacement opening between said lobes and of a width in the direction of rotation of said disk equal substantially to the spacing o fsaid bight portions flanking said windows while registering with said windows for affording access to brakeshoes disposed within the windows;

a respective brakeshoe received in each lobe of said caliper and fitting within the respective window of said plate of displacement transversely to said faces, each of said brakeshoes including a backing plate remote from the respective face of said disk and a brake lining on the backing plate and confronting said disk, said backing plates having radially outer portions;

at least one guide pin extending transversely to said faces and spanning said opening while lying outwardly of said disk in the direction of displacement of said brakeshoes, said outer portions of said brakeshoes being formed with apertures slidably receiving said pin for guiding said caliper relative to said brakeshoe and said brakeshoe relative to said plate;

actuating means in at least one of said lobes and bearing upon the respective backing plate for urging the corresponding brakeshoe against said disk while movement of said caliper at least in part applies the other brakeshoe against said disk; and a spring clip spanning said opening and removably secured to said support, said spring clip being generally of cruciform shape and having a first pair of spring tongues bearing yieldably against said outer portions of said backing plates for urging said brakeshoe apart; and a pair of securing tongues extending transversely to said pin and to said first pair of spring tongues while being fixed thereto, said securing tongues each reaching beneath a respective bight portion of said plate, said spring clip passing over said pin.

2. A disk brake comprising:
a brake disk rotatable about an axis and having a pair of opposite and parallel annular faces;
a brake caliper straddling the periphery of said disk and having a pair of lobes disposed along said opposite faces, said caliper being shiftable transversely to said faces, said caliper having a generally radial access opening;
a respective brakeshoe received in each lobe of said caliper in the radial access opening and engageable with the respective disk face;

actuating means in one of said lobes for urging one of said brakeshoes into engagement with one of said faces whereby said caliper draws the other of said brakeshoes against the other of said faces;

a nonrotatable plate fixed relative to said axis and disposed between said lobes and straddling said periphery, said plate having two sides formed with respective windows closely framing said brakeshoes and retaining said caliper and said brakeshoes against lateral entrainment by said disk, said windows opening radially outwardly with respect to the axis of said disk and a pair of bight portions of said plate connecting its two sides and flanking said windows;

a pair of guide pins spanning said lobes across the radially outer portions of said access opening and said windows, said brakeshoes being guided on said pins and retained thereby in said access opening and window;

and a spring clip passing over said pins and having tongues reaching beneath said bight portions of said plates.

3. The disk brake defined in claim 2 wherein said brakeshoes are formed with guide holes slidably receiving said pins.

4. The brake defined in claim 2 wherein said clip is a leaf spring provided with means for yieldably urging said brakeshoes away from each other.

5. The brake defined in claim 4 wherein said leaf spring includes a further spring tongue extending transverse to the first mentioned tongues and engaging said brakeshoes.

6. The brake defined in claim 5 wherein one of said lobes is provided with a hydraulic cylinder for operating said brake.

References Cited

UNITED STATES PATENTS

| 3,220,512 | 11/1965 | Coatalen | 188—73 |
| 3,260,332 | 7/1966 | Wells | 188—73 |
| 3,298,468 | 1/1967 | Buyze | 188—73 |
| 3,363,727 | 1/1968 | Thirion | 188—73 |

FOREIGN PATENTS

| 1,194,275 | 6/1965 | Germany. |
| 1,009,241 | 11/1965 | Great Britain. |

GEORGE E. A. HALVOSA, Primary Examiner

U S. Cl. X.R.

188—205